United States Patent
Turkovich

[11] 3,811,703
[45] May 21, 1974

[54] SAFETY BELT PROTECTOR

[75] Inventor: Frank D. Turkovich, Madison Heights, Mich.

[73] Assignee: Chrysler Corporation, Highland Park, Mich.

[22] Filed: Nov. 30, 1972

[21] Appl. No.: 311,028

[52] U.S. Cl. ... 280/150 SB, 242/107.4, 242/107 SB
[51] Int. Cl. ............................................. B60r 21/10
[58] Field of Search ............... 280/150 SB; 297/388; 242/107.4, 107.4 SB

[56] References Cited
UNITED STATES PATENTS
3,455,603  7/1969  Nicholas................... 280/150 SB X
3,321,244  5/1967  Davies...................... 280/150 SB X
3,659,801  5/1972  Romanzi................... 280/150 SB Primary Examiner—Robert R. Song
Attorney, Agent, or Firm—Talburtt & Baldwin

[57] ABSTRACT

A safety belt webbing guard for use in conjunction with a safety belt retractor mechanism which will remove any folds or twists in the webbing which might occur during safety belt usage before such twists interfere with functioning of the retractor. The guard comprises a sleeve portion through which the webbing passes just prior to being wound on the retractor with the sleeve being provided with runners which contact the webbing. The runners are shaped to unfurl any twists or loops which may be in the safety belt webbing.

5 Claims, 4 Drawing Figures

PATENTED MAY 21 1974 3,811,703
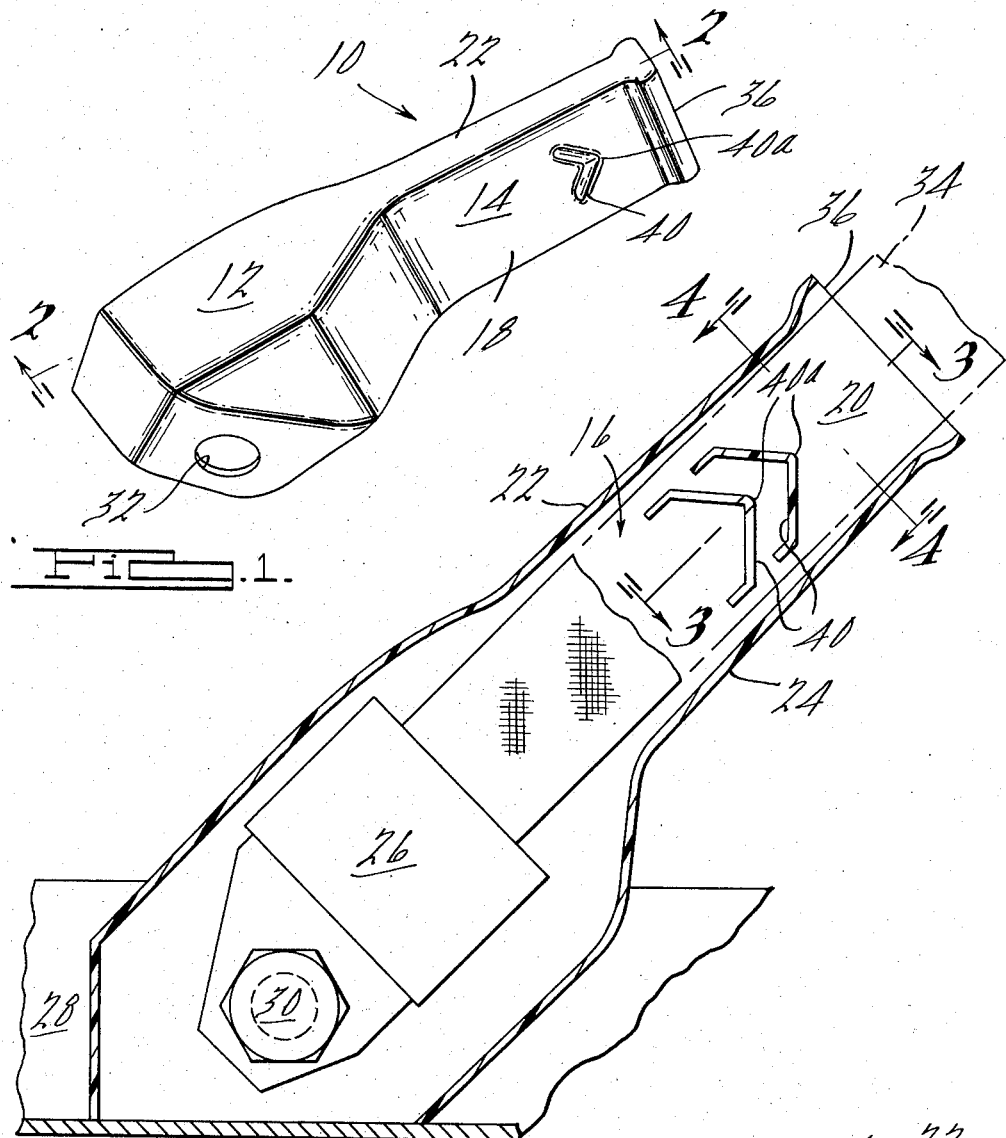
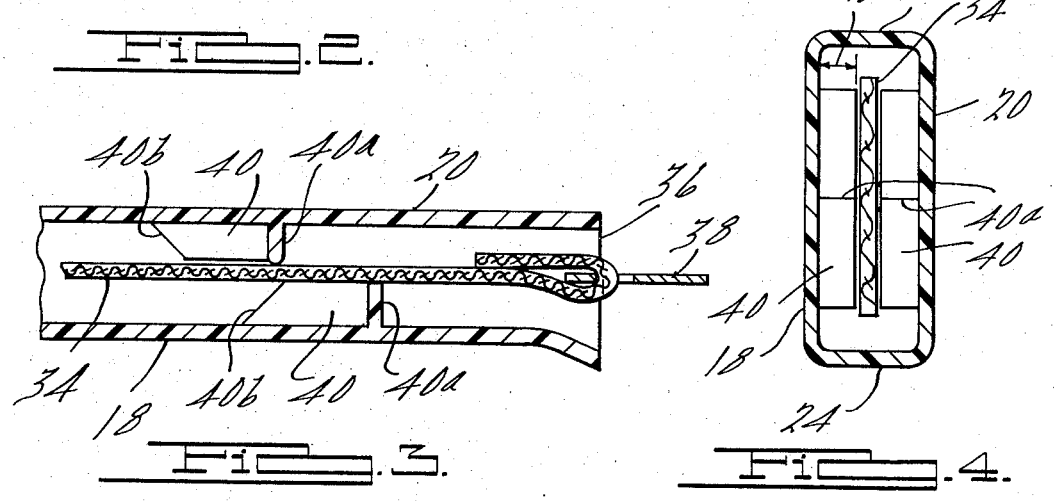

SAFETY BELT PROTECTOR

BACKGROUND OF THE INVENTION

This invention relates to an improvement in safety belt guards and retractor housings. Vehicle safety belt systems commonly employ housings in which are located the safety belt retractor and a portion of the webbing extending therefrom. Such housings serve several functions such as protecting the retractor and webbing from dirt, grease and other harmful substances which could adversely affect their appearance as well as operation. Another important function of such housings is to position the safety belt so that it is readily and easily accessible to the user thereof. In this aspect the retractor housing is composed of an enlarged chamber in which the retractor is located and a snout or tubular sleeve portion which prevents the safety belt webbing from being completely wound upon the retractor, and holds the webbing and its connector end portion within easy reach of the user.

During safety belt usage, it is not uncommon for the belt to become twisted and, accordingly, it is conventional to manufacture the snout or neck portion of the retractor housing such that the passage therethrough is extremely narrow thereby preventing the passage of a twist or loop in the webbing which might contact the retractor and cause it to malfunction. More recently, however, housings are being provided with longer sleeve or neck portions to better position the webbing adjacent the user's location and, accordingly, the material used to fabricate the housing neck must have greater rigidity to support both its weight and weight of the webbing and associated connector. The need for such increased rigidity and housing size has led to greater difficulty in controlling manufacturing tolerances to the degree needed to insure a sleeve or neck passage which is only large enough to allow passage of the webbing free from twists or loops.

Accordingly, a need exists for a housing having means which will guide the webbing as it is extended and retracted and which will prevent twists in the webbing from reaching the retractor.

SUMMARY OF THE INVENTION

According to this invention, a construction is proposed wherein the snout or throat portion of a safety belt retractor housing is provided with ramps or runners which are formed on opposite walls of the throat so as to engage the safety belt webbing as it passes through the throat. The provision of such ramp results in less critical, and hence, less expensive manufacturing since the entire throat passage may be of larger dimension thereby lessening manufacturing tolerance considerations. More importantly, the runners can be shaped so that they untwist or unfurl the webbing as it passes the runners.

Further objects of the invention will be apparent from the following description when considered in connection with the accompanying drawings.

DESCRIPTION OF THE DRAWINGS

FIG. 1 is a perspective view of a seat belt retractor housing having the novel anti-twist runners in the throat portion;

FIG. 2 is a sectional view taken in a direction generally along line 2—2 of FIG. 1 showing a retractor and safety webbing positioned in the housing;

FIG. 3 is a sectional view taken along line 3—3 of FIG. 2; and

FIG. 4 is a sectional view taken along line 4—4 of FIG. 2.

DESCRIPTION OF THE PREFERRED EMBODIMENT

FIG. 1 illustrates a safety belt retractor housing indicated generally by 10 having an enlarged chamber portion 12 and an elongated sleeve or throat portion 14 integrally connected therewith. The housing 10 is a tubular formation with the sleeve 14 having a passageway 16 defined therein by spaced housing sidewalls 18 and 20, and upper and lower walls 22 and 24. A retractor 26 of any type is located in the chamber through an opening in the rearward wall of chamber 12 and the retractor and housing are secured to a portion of a vehicle such as a door opening sill 28 by means of a fastener 30 to which access may be had by means of opening 32 in housing 10.

Safety belt webbing 34 is secured to the retractor 26 and passes through passageway 16 of sleeve 14. An end of the safety belt extends from the housing 10 through an opening 36 in the end portion of the sleeve 14 and is connected with a buckle portion 38. The retractor which is conventional and forms no part of this invention normally maintains the safety belt in a retracted position. The size of the opening 36 in the sleeve is smaller than the buckle 38, and hence, the buckle abuts the outside of the housing, keeping the webbing from completely passing into the housing, where it may be readily grasped for employment of the safety belt.

The inventive feature of housing 10 resides in placing one or more protuberances or ramps in the passageway 16 of the sleeve 14 to prevent any twists or furls in the webbing from becoming lodged in the sleeve and thereby interfering with retractor performance. These protuberances, such as runners 40, form a restriction in the sleeve passageway 16 and contact the safety webbing in the passageway. Accordingly, it is no longer necessary to form, with the attendant manufacturing difficulties, a very narrow passageway the length of the sleeve to prevent twists in the webbing from affecting the retractor.

The housing can be made from any number of metal or plastic materials. Generally, a plastic such as a vinyl resin is employed as it can be decor colored, easily styled, and yet provide a strong but flexible protective support. Other suitable materials include polyethylene, polypropylene or acylonthilebutadiene-styrene polymers and the housing can be fabricated by conventional cast, dip or injection molding techniques.

In the preferred embodiment of the invention a runner 40 is formed on opposite walls 18, 20 of the sleeve passageway 16 such that the belt passes therebetween. While one runner could be used, best results are obtained with two or three. The runners are also preferably formed in a wedge shape with the apex 40a lying near the sleeve outlet opening 36. It will be appreciated that in this position the leading edge or apex 40a of the wedge will engage and unfurl any twist which enters the housing as the seat belt webbing is retracted. Again, to eliminate housing manufacturing tolerances becoming critical, as for example if the housing is molded becoming two longitudinal extending sections which are then bonded, the runners 40 are longitudinally spaced from each other. Thus, the manufacturing tolerance for the height $h$ of each of the runners need not be so closely controlled in order to ensure proper spacing between opposing faces of the runners. Some degree of overlap of the oppositely disposed runners is desirable to ensure cooperative action as between the runners in unfurling the the webbing and each runner is, therefore, provided with a sloping surface 40b. The runners are then positioned in the sleeve 14 so that parallel surfaces on oppositely disposed runners do not overlap as seen in FIG. 3.

I claim:

1. A safety belt webbing protector device comprising a sleeve member having walls which define a passageway through which a safety belt webbing may pass, an opening located adjacent at least one end portion of said sleeve by which the safety belt webbing may communicate with said passageway and at least two runners formed on the walls of said sleeve with at least one of said runners being in a wall opposite from that of another runner, said runners being adjacent the opening in said sleeve and in overlapping relationship with respect to each other, said runners extending into said passageway so as to be engageable with a safety belt webbing in said passageway to prevent any twists which might be placed in the webbing in the course of safety belt usage from passing through the passageway.

2. A safety belt webbing protector device as provided in claim 1 wherein said runners are wedge-shaped with the wedge being positioned such that its apex portion is closed to the opening in said sleeve.

3. In a protective housing for a safety belt and associated retractor wherein the housing has a chamber portion at one end thereof a size suitable to accommodate a retractor and a sleeve portion extending from said chamber portion defining a passageway through which a safety belt webbing may pass, said sleeve being provided with an opening adjacent one end portion by which the safety belt webbing may be extracted from the protective housing, the improvement which comprises providing at least two runners integrally formed on the sleeve walls defining said passageway with at least one of said runners being positioned on a wall opposite that of the other, said oppositely disposed runners being adjacent the opening in said sleeve and in overlapping relationship with respect to each other, said runners being engageable with said safety belt webbing to prevent any twists which might be placed in the webbing in the course of safety belt usage from passing through the passageway.

4. A protective housing as provided for in claim 3 wherein said runners are wedge-shaped with the wedge being positioned such that its apex is closest to the opening in said sleeve.

5. A safety belt webbing protector device comprising a sleeve member having walls which define a passageway through which a safety belt webbing may pass, an opening located adjacent at least one end portion of said sleeve by which the safety belt webbing may communicate with said passageway and a wedge-shaped runner integrally formed on a wall of said passageway so that its apex is closest to the opening in said sleeve, said runner extending into said passageway so as to be engageable with a safety belt webbing in said passageway to prevent any twists which might be placed in the webbing in the course of safety belt usage from passing through the passageway.

* * * * *